United States Patent [19]

Ikushima

[11] 4,001,885

[45] Jan. 4, 1977

[54] VIDEO RECORDING AND REPRODUCING SYSTEM

[75] Inventor: Yoshiyuki Ikushima, Hirakata, Japan

[73] Assignee: Sharp Kabushiki Kaisha, Osaka, Japan

[22] Filed: Mar. 3, 1975

[21] Appl. No.: 554,603

[30] Foreign Application Priority Data

Mar. 1, 1974 Japan ............................ 49-24354
July 12, 1974 Japan ............................ 49-81023

[52] U.S. Cl. .................................. 360/70; 360/9; 360/35; 360/84; 360/85

[51] Int. Cl.² ................ H04N 5/785; G11B 15/44; G11B 15/46

[58] Field of Search ................................ 360/8–11, 360/33, 35, 70, 73, 84, 85; 178/6.6 FS, 6.6 SF, 6.6 P

[56] References Cited

UNITED STATES PATENTS

| | | | |
|---|---|---|---|
| 2,876,295 | 3/1959 | Irby | 360/84 |
| 3,157,739 | 11/1964 | Okamura | 360/10 |
| 3,170,031 | 2/1965 | Okamura | 360/9 |
| 3,573,356 | 4/1971 | Toce | 360/9 |
| 3,869,709 | 3/1975 | Yamagishi et al. | 360/10 |

*Primary Examiner*—Raymond F. Cardillo, Jr.
*Attorney, Agent, or Firm*—Stewart and Kolasch, Ltd.

[57] ABSTRACT

The video recording and reproducing system disclosed herein is adapted to perform record and/or playback in two selectable modes. In one mode of operation termed "standard mode," only one field of television video signal is recorded on or reproduced from each of the oblique tracks on a recording medium. In the other mode of operation termed "period expansion mode," n fields of the television video signal (n : multiple integer equal two, to or more than two) may be recorded on or reproduced from each of the oblique tracks. A switch-over from the standard mode to the period expansion mode is achieved by a 1/n reduction of relative speed between the recording medium and rotary transducing head assembly.

3 Claims, 12 Drawing Figures

VIDEO RECORDING AND REPRODUCING SYSTEM

This invention relates generally to a system for magnetically recording and reproducing video signals such as color television signals and more particularly to a magnetic tape recording and reproducing system (VTR) of the so-called "helical scan" type wherein the video signals are recorded on and/or reproduced from a series of oblique tracks by means of a rotary transducing head.

Certain VTR cartridge standardizations, for example, the unified I type VTR cartridge standardization established by ELECTRONIC INDUSTRIES ASSOCIATION OF JAPAN specifies the nominal record and playback period of time as 30 minutes. The recording of a television program or programs for one hour, therefore, requires cartridge substitution at least one time and hence with the necessity for establishing time for interruption of record and playback operations. For this reason, it is not insured that the 1-hour television program or programs be recorded and played back through the full length.

One of the features of this invention is that the VTR is provided with the capability of substantially expanding or extending a period of time for record and/or playback per a unit length of a magnetic recording tape (or recording medium) if desired.

Another feature of this invention is that the present VTR system, in addition to the standard mode operation, may expand its period of time for record and playback thereby to accomplish the recording and reproducing functions with a much higher degree of density without any modifications or adaptations in construction of a rotary transducing head assembly and in the course of tape travel.

A still further feature of this invention is that the present VTR system, as set forth above, may function in a separate novel mode (it will be referred to as period expansion mode hereinafter) wherein n fields ($n$: a multiple integer equal to 2, or more than 2) of the video signal are recorded and/or reproduced for each of the one-half revolution of the head assembly by $1/n$ reduction of the travelling speed of the recording medium and of the relative speed between the recording medium and the rotary transducing head assembly.

A further feature of this invention is that the present VTR system is operable selectively between the standard mode and the period expansion mode and specifically the relative speed between the recording medium and the rotary transducing head is divided down by n during record and/or playback and otherwise being returned to the same as in the standard mode, thereby performing precisely the threading function and shortening the respective periods of time for fast forward and rewind as is the case of the standard mode.

A still further feature of this invention is that the present VTR system operable in either of the two modes is adapted to scan the respective ones of tracks for record and playback by means of the same rotary transducing head in order to minimize errors which may occur during playback.

A further feature of this invention is that the two mode operable VTR system may accomplish tracking adjustment in simple implementation with the simplicity of operation and high degree of accuracy for both of the operational modes.

Further features of this invention will become apparent from a consideration of the accompanying specification, claims, and drawing of which:

Although this invention is in no way limited to improvement in the operation mode of tape recording and reproducing apparatus for storing color television signals, this invention will be described hereinafter in terms of a helical scan type magnetic tape recording system which employs the I type VTR cartridge standardization established by ELECTRONIC INDUSTRIES ASSOCIATION OF JAPAN and the period expansion mode of operation briefly described above wherein $n = 2$.

Figure 1:
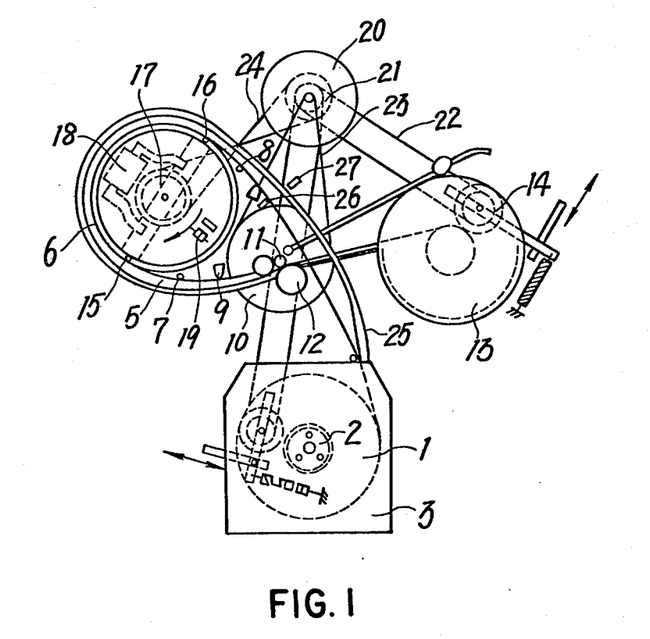
FIG. 1 is a schematic view of the VTR system in accordance with this invention.

Referring now to FIG. 1, there is shown schematics of a VTR (focused on its tape travelling system) employing both of the operational modes, one being the standard mode as conventional in the art and the other being the period expansion mode as uniquely developed from teachings of this invention. A tape supply reel 1 is disposed on a supply reel turntable 2 within a cartridge casing 3, on which a magnetic tape (recording medium) 5 is wound as including a leading tape 4 made of transparent and rigid material. A tape guide cylinder 6 and a pair of guide poles 7 and 8 are positioned such that the magnetic tape 5 travels along a predetermined path at which there are provided a control transducing head 9 for recording reproducing of control signals on the magnetic tape 5 and a capstan drive arrangement comprising a capstan 11 carrying a capstan flywheel 10 and a pinch roller 12 adapted for the pulling or moving of the tape 5 at a desired speed. The magnetic tape 5 thus travels via the combination of the capstan 11 and the pinch roller 12 and then reaches a takeup reel 13 due to action of a takeup idler 14.

A pair of rotary transducing heads 15 and 16 are spaced away from each other at an angular displacement of 180° and disposed on the cylinder 6 in a manner to revolve through a pulley 17. Provision of a brake coil 18 is made to control revolution of the rotary transducing heads 15 and 16. While provision of a tone wheel head 19 is made to sense positions of the rotary transducing heads 15 and 16 during revolution. A two-speed motor 20 is alterable between two speeds, one employed with the standard mode of operation and the other employed with the period explansion mode of operation. The motor 20 is provided with a pulley 21.

Three belts 22, 23 and 24 extend respectively between the motor pulley 21 and the takeup reel idler 14, between the motor pulley 21 and the capstan flywheel 10 and the motor pulley 21 and the rotary transducing head pulley 17. The capstan 11, the takeup reel 13 and the pair of the rotary transducing heads 15 and 16 are arranged in predetermined relative positions to permit revolution at either of two selectable speeds, one for the standard mode and the other for the period expansion mode. The leading tape guide 25 functions to aid in travelling the leading tape 4 along the accurate path where a tape sensing station is provided as including a light-emitting element 26 such as light-emitting diode (LED) and a light-responsive element 27 such as a solar cell.

The further description will proceed with the standard mode of operation and then the novel period expansion mode of operation.

Figure 2:
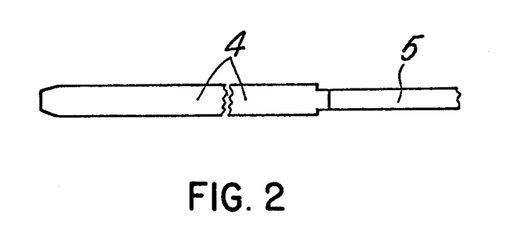
FIG. 2 is a partially enlarged view of a portion of a magnetic tape inclusive of a leading tape.
Figure 3:
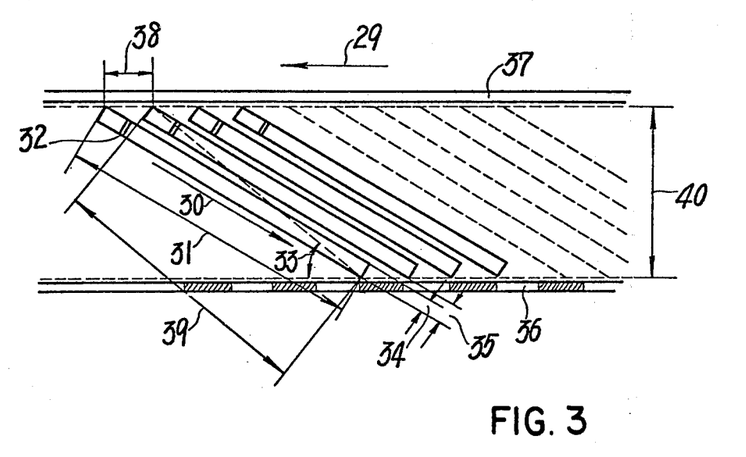
FIG. 3 is an enlarged view of a symbolic form of a magnetic pattern recorded in accordance with the standard mode of operation by the present VTR system.

Referring now to FIGS. 1 through 3 inclusive with respect to the standard mode, when threading, the leading tape 4 is first placed in order through a succession of elements comprising the leading tape guide 25, the tape sensing station, the spacing between the capstan 11 and the pinch roller 12 and the takeup reel 13. Following the leading tape 4, the magnetic tape 5 on which intelligence information is to be recorded and reproduced, is wound on the takeup reel 13. In this way, the magnetic recording tape 5 is wound in a "Ω" shape (in section) about the tape guide cylinder 6 (roughly along the one-half of its circumference, slightly above 180°), as is well known to those skilled in the art. The recording tape 5 is driven via co-operation between the capstan 11 and the pinch roller 12 and then wound into the takeup reel 13 at a given speed, for example, 19.05 cm per second. At this time the two speed motor 20 is rotating at a higher speed suited for the standard mode, e.g., 1800 rpm, and this revolution of the motor 20 is transmitted via the belts 22, 23 and 24 to the takeup idler 14, the capstan 11 and the rotary transducing head pulley 17, respectively.

A predetermined reduction ratio of the motor pulley 21 associated with the two-speed motor 20 is such that the two rotary transducing heads 15 and 16 revolve at a speed slightly higher than that of the two speed motor 20, i.e. 1836 rpm (plus about 2%).

In the actual record and playback conditions, the revolution of the rotary transducing heads 15 and 16 are varied under control for exciting current through the brake coil 18 and simultaneously any error in revolution is prevented from occurring by elastically slipping of the pulley belt 24. Such revolution of the rotary transducing heads 15 and 16 is in synchronism with the one-half (29.97 Hz) of the frequency 59.94 Hz of the vertical synchronizing signal of the video signals (i.e. television signals of NTSC system). Thus, the period of time required for the rotary transducing heads 15 and 16 to make the half revolution, corresponds, respectively, to one field of the television signals and, accordingly, the two transducing heads 15 and 16 function to record and reproduce odd fields and even fields of the television signals, respectively.

As noted earlier, the magnetic tape 5 is wound in an "Ω" shape about the guide cylinder 6 and its upward and downward movement is inhibited by means of the guide poles 7 and 8. The tape 5 travels in the left direction at 19.05 cm per second, while the pair of the rotary transducing heads 15 and 16 revolve in synchronism with the one-half of the vertical synchronizing frequency of the video signals to be recorded (i.e. 29.97 Hz in the case recorded by the NTSC system television signals). The half revolution of the transducing heads 15 and 16 permits recording of a respective one field and thus the complete revolution thereof permits that of a respective one frame. As set forth above, the two transducing heads 15 and 16 function to record and reproduce exclusively odd fields and even fields, respectively.

The magnetically recorded pattern as the result of the above discussed operation is illustrated in a diagrammatic view of FIG. 3.

In this drawing, the arrow 29 indicates the travelling direction of the magnetic tape 5 whereas the arrow 30 indicates the direction of movement of the rotary transducing heads 15 and 16. In the illustrative embodiment, the relative speed is 11.1 m per second. 31 designates the length on a video track of a respective one field, 32 designates the position which contains the vertical synchronizing signal, 33 designates angular positions of the rotary transducing heads 15 and 16 when the tape is stationary, 34 designates the width of video tracks, 35 designates spacing between these video tracks and 36 designates a control track which is filled with a rectangular signal of 29.97 Hz. Furthermore, 37 designates a sound track, 38 designates the distance between the beginnings of the two adjacent tracks along the travelling direction of the tape, 39 designates the length where the rotary transducing heads 15 and 16 are in contact with the magnetic tape 5 when the latter is stationary, and 40 designates the length of the video track along the vertical axis.

The standard mode of operation wherein one field of the video signal is recorded every half revolution of the rotary transducing heads has been illustrated and described in the foregoing.

The second or period expansion mode of operation will be now described with reference to FIG. 1, FIG. 2 and FIG. 4. The description of the tape threading and driving operations will be omitted because of identity with the standard mode of operation.

The two speed motor 20 of FIG. 1 rotates at the lower speed that speed being halved from the original speed employed with the standard mode, for example, 900 rpm. It will be noted that selection between the high and low speeds is made possible through a pole change in the case employing a conventional synchronous motor and through controls is both frequency and phase in the case employing a conventional d.c. motor. FIG. 4 is for the former.

Upon reduction of revolution speed of the two speed motor 20 the revolution speed of the rotary transducing heads 15 and 16 becomes 900 rpm and then the revolution speed of the capstan 11, the supply reel 1 and the takeup reel 13 becomes the one-half of the original speed. This result is that the rate of movement of the magnetic tape becomes slower than that in the standard mode (i.e. from 19.05 cm per second to 9.525 cm per second).

Figure 4:
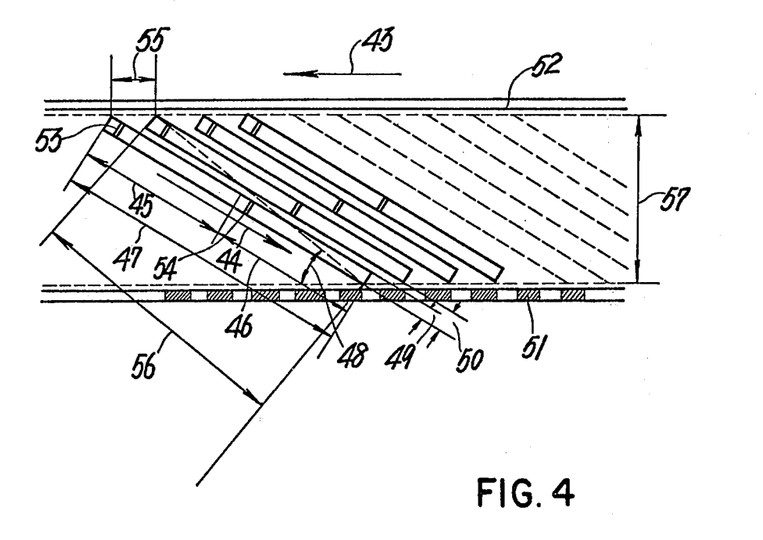
FIG. 4 is an enlarged view of the counterpart recorded in accordance with the period expansion mode of operation by the present VTR system.

The resutting pattern magnetically recorded on the tape 5 due to the sequential operations set forth above is illustrated in FIG. 4.

FIG. 4 shows the resulting pattern on the magnetic tape 5 as viewed from the magnetizable surface, wherein the arrow 43 indicates the direction of movement of the magnetic tape 5 while the arrow 44 indicates that of the rotary tranducing heads 15 and 16. In the example given above, the relative speed between these two items becomes 5.54 m per second, i.e. the one-half of the initial speed.

In such a diagrammatic view the following notation will be used to designate the quantities indicated: 45, the length of the video tracks for respective alternate ones of either odd or even fields of the video signal to be recorded; 46, the length of the video tracks for the remaining alternate or either even or odd field of the video signal; 47, that for two fields of the video signal; 48, an angular displacement of the rotary transducing heads 15 and 16 when the magnetic tape 5 is stationary; 49, the width of the video track; 50, the pitch of the video track; 51, the control track; 52, the sound track; 53, the position which contains the vertical synchronizing signal for the alternate field or either the odd or even field; 54, the position which contains the vertical synchronizing signal for the remaining alternate field or either the even or odd field; 55, the distance between the beginnings of the two adjacent tracks; 56, the length where the rotary transducing heads 15 and 16 are in contact with the magnetic tape 5 when it is stationary and 57, the length of the video track along the vertical axis of the tape 5.

As discussed in the foregoing, the period expansion mode of operation permits the recording of two fields or one frame for every half revolution of the rotary transducing heads. In other words, a full revolution of the two rotary transducing heads permits four fields or two frames to be recorded. This enables the double recording density as compared with the standard mode. Since both the standard mode and the period expansion mode employ the same rotary transducing heads 15 and 16, the width 49 of the video track in the period expansion mode of operation coincides with the width 34 in the standard mode. Assuming that the guard width of the video track is equal for both modes, then the pitch 35 and 50 of the video tracks will be equal for the both modes. In conclusion, compression of the recording density in the period expansion mode may be accomplished by reduction of the relative speed. This implies that the speed of the magnetic tape may be divided down by two and the period expansion mode is dependent upon extension of the period of time for record and playback.

An appropriate switching circuit is implemented such that the video signal for each of one field is impressed on the rotary transducing heads 15 and 16 every half revolution thereof when in the standard mode and alternatively the video signal for each of two fields is impressed thereon every half revolution when in the period expansion mode.

Since the high-density recording is essential for the period expansion mode of operation, employment of the rotary transducing heads and the magnetic tape of the substantially same performance will result in decrease in the performance of the recording system. Although $\gamma$-$Fe_2O_3$ tape with coercive force $H_c$ of approximate 300 oersteds is fully satisfactory for the I type VTR cartridge standardization defined by ELECTRONIC INDUSTRIES ASSOCIATION OF JAPAN, it is preferable for the period expansion mode of the present invention to employ the so-called high-density magnetic tape which comprises $\gamma$-$Fe_2O_3$ film material and an addition agent $Cr_2O_2$ or Co with toral coercive force $H_c$ of 500 – 600 oersteds. In addition, preferrably, the high-performance head is employed and its gap length is shortened to approach 0.5 $\mu$m. A recording circuit arrangement requires adjustment for optimum recording current in accordance with the kinds of the magnetic tapes used in the system, while a reproducing circuit arrangement requires switchover for compensation for frequency characteristics of the reproduced outputs. Thus, appropriate switch means are provided.

Within VTR system of such a construction, phase control for the rotary transducing heads used in the standard and period expansion modes upon modification in the revolution speed of the rotary transducing heads 15 and 16 and in the speed of the tape travel will be described in detail referring to FIGS. 5 and 6.

Figure 5:
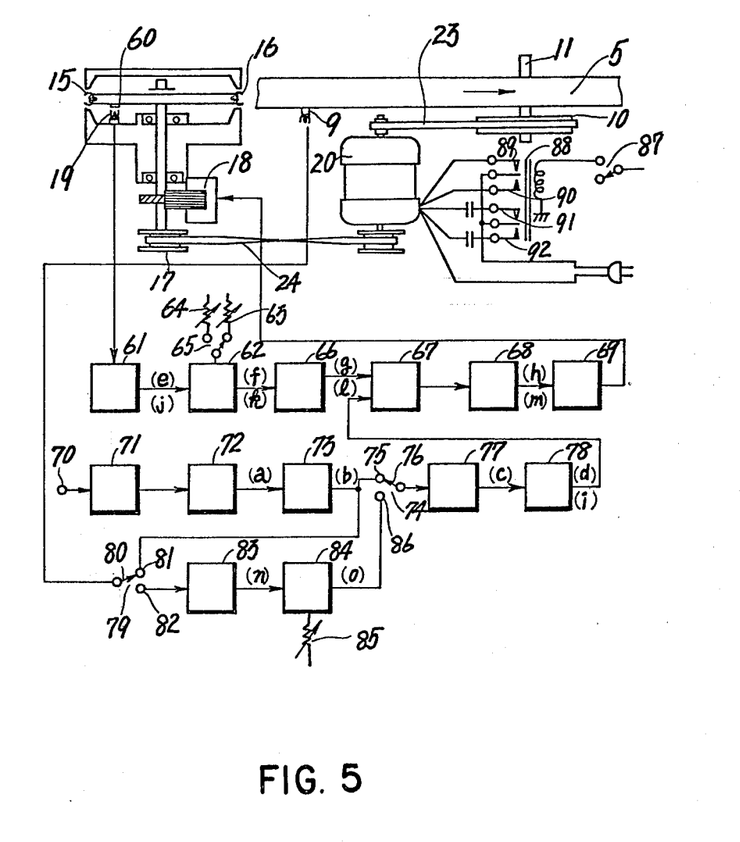
FIG. 5 is a schematic diagram of a phase control for a rotary transducing head of the present VTR system.

In FIG. 5, a pulse amplifier 61 which amplifies the outputs sensed by the tone wheel head 19 responsive to revolution of an iron chip 60 affixed to the rotary transducing head assembly is coupled with a delay circuit 62 consisting of a mono-stable multivibrator. The delay circuit 62 is provided with a switch 65 which selects either of a variable resistor 63 for adjustment of the recording position employed with the standard mode or a second variable resistor 64 for adjustment of the recording position employed with the period expansion mode.

The delay circuit 62 is further coupled with a differentiation circuit 66 which in turn is connected with a gate circuit 67. The output from the gate circuit 67 is coupled with a hold circuit 68 of which the output is applied to a brake coil activator circuit 69 operatively associated with the brake coil 18.

A signal terminal 70 which receives the video signal is coupled with a vertical synchronizing splitter 71 which is coupled with a pulse amplifier 72. A flip flop 73 follows the pulse amplifier 72. A record/playback switch 74 has a movable terminal 76 connected with a mono-stable multivibrator 77, a record terminal 75 connected with the flip flop 73 and a playback terminal 86 to be described later. The mono-stable multivibrator 77 is connected with a trapezoid-wave generator 78 the output of which is returned back to the gate circuit 67 as its second input.

A second record/playback switch 79 has a movable terminal 80 coupled with the control head 9, a record terminal 81 coupled with the record terminal 75 of the first record/playback switch 74, and a playback terminal 82 coupled with a pulse amplifier 83 for amplifying the output from the control head 9. The pulse amplifier 83 is connected in series with a circuit 100$p$ the terminating end of which is connected with the playback terminal 86 of the first record/playback switch 74, the circuit 100$p$ including a mono-stable multivibrator 84 which has a variable resistor 85 for adjustment of tracking during playback.

In the embodiment of FIG. 5, because of the two speed motor 20 being of the synchronous type, speed change is achieved due to energization of a relay coil 88 through a relay switch 87 by which the respective movable contacts thereof are turned from the fixed contacts 89 and 90 for primary winding to the contacts 91 and 92 for auxiliary winding and phase advance capacitor and vice versa.

Figure 6:
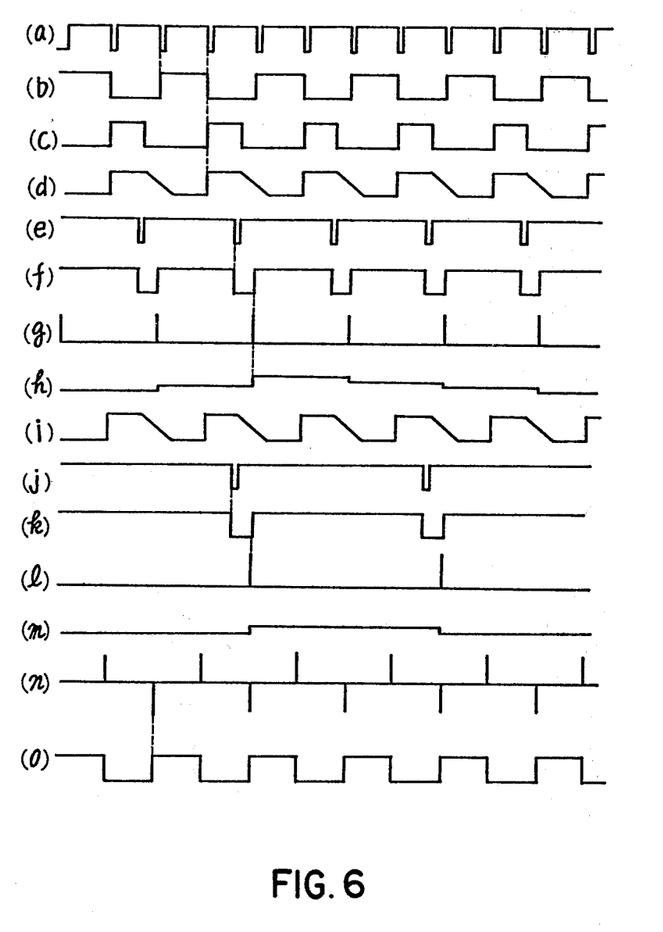
FIG. 6 is an illustrative diagram of waveforms of outputs derived from respective points of the circuit of FIG. 5.

The operational conditions of the phase control arrangement for the rotary transducing heads as set forth above will be readily understood from a reading of the following description with reference to FIGS. 5 and 6. First of all, the recording condition in the standard mode of operation when the two speed motor 20 is rotating at the high speed is as follows.

The first and second record/playback switches 74 and 79 establish respectively conduction paths between the movable terminal 76 and the record terminal 75 and between the movable terminal 79 and the record terminal 81. The switch 65 also is turned to the variable resistor 63 for adjustment of the recording position in the standard mode. When the video signal is impressed on the input terminal 70, the vertical synchronizing splitter 71 produces the vertical synchronizing pulses from the video signal, the thus obtained vertical synchronizing pulses being supplied to the pulse amplifier 72 to amplify the same. At this time the pulse amplifier 72 derives from its output terminal the 59.94 Hz pulse as shown in FIG. 6(a) which in turn is supplied to the flip flop 73 thereby performing one-half division in frequency of that pulse. The resultant frequency divided down pulse is illustrated in FIG. 6(b).

Application of that pulse to the control head 9 via the record/playback switch 79 permits the control signal to be recorded on the magnetic tape 5 by means of the control head 9. Similarly, application of that pulse to the monostable multivibrator 77 via the record/playback switch 74 permits the pulse shown in FIG. 6(c) to develop at the output terminal of the multivibrator 77, that pulse being supplied to the trapezoidal waveform generator 78 so that the trapezoidal pulse as shown in FIG. 6(d) develops at the output terminal of the generator 78 for further transmission to the gate circuit 67.

Also, the iron chip 60 rotating in union with revolution of the rotary transducing heads 15 and 16 permits the tonewheel head 19 to produce a pulse signal each full revolution of the transducing heads. Such output pulse from the tonewheel head 19 is amplified through the pulse amplifier 61 which in turn provides the pulse as shown in FIG. 6(e) at the output terminal thereof. This is impressed on the delay circuit 62 to occur delay of a given period of time as shown in FIG. 6(f), the resultant delay pulse being then differentiated by the differentiation circuit 66 of which the output is shown in FIG. 6(g).

The differentiation output of FIG. 6(g) is applied to the gate circuit 67 which compares it with the trapezoidal output from the trapezoidal generator 78 with respect to phase relation to develop a d.c. voltage proportional to that phase deviation at the output terminal thereof. The d.c. voltage is then impressed on the hold circuit 68 which stores it for two field periods and provides at the output terminal thereof the d.c. voltage as shown in FIG. 6(h).

The brake activator circuit 69 receives the d.c. voltage and correspondingly controls current flow through the brake coil 18 so that the revolution rate of the rotary transducing heads is varied from the initial value corresponding to 30.5 Hz to the desired value corresponding to 29.97 Hz (i.e., the one-half of the field frequency) by virtue of the vertical synchronizing signal contained within the video signal.

Pursuant to the I type standardization set forth above, the recording position of the transducing heads is defined as being situated distance of 5H ± 5H (wherein H designates a horizontal line period) before the leading edge of the vertical synchronizing signal. Adjustment for the pulse width in the multivibrator 62 is accomplished through the manual operation of the variable resistor 63 to exhibit the substantially same effect as being obtained from variation of the position of the tonewheel head 19.

The following will be for the operational conditions of the recording in the period extension mode of operation when the two speed motor 20 is rotating at the low speed. The switch 65 and the relay switch 87 are both turned to the period expansion mode. In other words, the mode switch 65 disables the resistor 63 useful for the standard mode and enables the resistor 64 useful for the period expansion mode. Further, the relay switch 87 energizes the relay 88 for the two speed motor 20 such that the motor 20 decelerates through the contacts 89, 90, 91 and 92.

On record the video signal is impressed on the input terminal 70 as discussed previously so that due to the sequential operations the gate circuit 67 receives the trapezoidal waveform as shown in FIG. 6(i) from the generator 78.

The tone wheel head 19 produces a pulse signal each full revolution of the transducing heads when the iron chip 60 is rotating in union with the heads 15 and 16, the pulse signal being then amplified through the pulse amplifier 61. Under these circumstances, the pulse is shown in FIG. 6(j) as having twice the period of that employed with the standard mode, develops at the output terminal of the pulse amplifier 61 and thereafter is applied to the delay circuit 62 to produce the delay pulse as shown in FIG. 6(k). The resultant delay pulse is supplied to the differentiation circuit 66 to produce the pulse as shown in FIG. 6(l) at the output terminal thereof. The gate circuit 67 responds to both the output from the differentiation circuit 66 and the trapezoidal output from the generator 78 and then compares them as to phase thereby to produce the d.c. voltage in proportion with the phase deviation. The hold circuit 68 is responsive to the d.c. voltage to hold it for a two-frame period (period for a full revolution of the heads), the resultant d.c. voltage being depicted in FIG. 6(m).

The d.c. voltage from the hold circuit 68 is supplied through the brake actuator circuit 69 to the brake coil 18 thereby controlling current flow therethrough with the results that the revolution speed of the rotary transducing heads is reduced to the value corresponding to 14.98 Hz equal to the one-half of that in the standard mode thereby performing phase control with reference to the vertical synchronizing signal of the video signal.

The recording position (the beginning of the recording) in the period expansion mode of operation will be situated 10H " 10H before the leading edge of the vertical synchronizing signal under the assumption that the delay time equal to that used with the standard mode, because the relative speed in the period expansion mode is slower than that in the standard mode. Therefore, there is a possibility of developing noise at head change at the lower portion of the television screen during playback. For this reason the delay time of the multivibrator 62 is variable through the resistor 64.

Under the playback conditions when the motor 20 is rotating at the high speed, the terminals 76 and 80 of the switches 74 and 79 are positioned at the playback side 86 and 82 such that the control head 9 reproduces the control signal from the magnetic tape 5. Such control signal is applied to the pulse amplifier 83 which in turn outputs the pulse of FIG. 6(n) to the multivibrator 84. The variable resistor 85 in the multivibrator 84 permits change in the delay time and thus tracking adjustment.

The pulse as shown in FIG. 6(o) appears at the output terminal of the multivibrator 84 is supplied via the record/playback switch 74 to the multivibrator 77, thereby controlling the revolution speed and phase of the rotary transducing heads 15 and 16 as in the case of the record conditions in the standard mode. Similarly, the phase control for the transducing heads 15 and 16 also is accomplished with reference to the control signal on the magnetic tape 5 in the case of the period expansion mode.

The operational principle is identical for both the modes and only distinction between the standard mode and the period expansion mode is frequency to be controlled.

Within the VTR system operable in both modes, the leading tape as shown in FIG. 2 is inserted into the guide 25 (FIG. 1) concurrently with the beginning of the threading operation, and when it passes through the tape sensing station consisted of the light-emitting element 26 and light-responsive element 27. Light from the element 26 will reach the element 27 without interruption due to the transparency of the leading tape 4. Then, following the leading tape 4 wound on the takeup reel 13, the magnetic tape 5 is derived form the interior of the cartridge. As the magnetic tape 5 passes through the tape sensing station, light from the light-emitting element 26 is blocked due to non-transparency of the magnetic tape 5 thereby sensing an arrival of the magnetic tape 5.

During the standard mode of operation, the supply reel 1 automatically starts to rotate in the opposite direction if a period of time from the beginning of the threading operation to the detection of the magnetic tape 5 exceeds a predetermined period. The magnetic tape 5 and the leading tape 4 are rewound on the supply reel 1. For example, in the course of the threading operation, the leading tape 4 may cease within the guide 25 due to damage in the leading tape 4 so that the magnetic tape 5 can not reach the tape sensing station within the predetermined period. Thus, the magnetic tape 5 will be automatically rewound on the supply reel.

The switch 87 of FIG. 5 alters the speed of the two speed motor 20. Since the motor 20 is rotating at the low speed during the period expansion mode, the revolution rate of the supply reel 1 of FIG. 1 and hence the speed of movement of the leading tape 4 will be reduced to the half value. This means that the period of time from the threading to the arrival of the magnetic tape 5 at the sensing station becomes twice as long as that in the case of the standard mode. Since that period exceeds fully the predetermined one, the magnetic tape 5 and the leading tape 4 are automatically rewound on the supply reel 1. The takeup reel 13, therefore, fails to roll up both of the tapes. This provides problem associated with the threading operation only during the period expansion mode. There are further disadvantages during the period expansion mode that the fast forward and rewind operations require a longer period of time because the motor 20 rotates at the low speed even for the fast forward and rewind operations.

Figure 7:
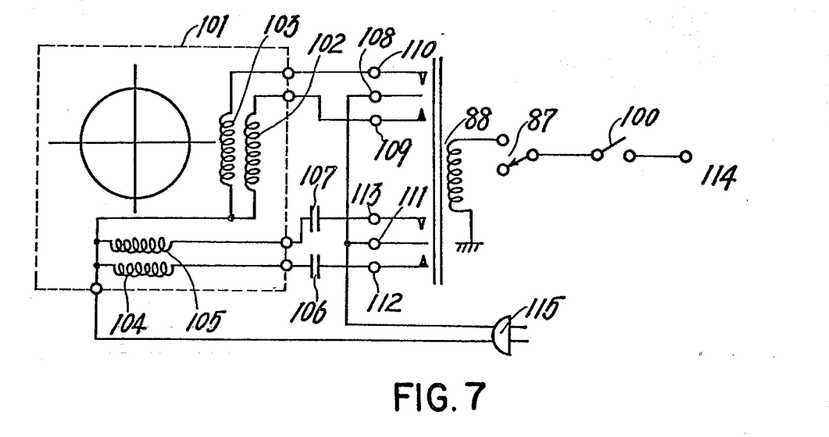
FIG. 7 is a partially schematic diagram of another embodiment of the present VTR system.

One way of overcoming these disadvantages is suggested in FIG. 7 wherein a record/playback switch 100 is provided for the purpose of connecting the switch 87 with a d.c. voltage source only during record and playback. With such an arrangement, the two speed motor 20 is selectable between the high and low speeds only for record and playback and is fixed in speed for threading, fast forward, rewind, etc.

Referring now to FIG. 7, the dotted area 101 designates the two speed motor 20 which is selectable between four poles and eight poles. The motor 20 shown herein has primary windings 102 and 103, auxiliary windings 104 and 105 and phase advancing capacitors 106 and 107, for selection between four poles and eight poles. In addition, the switch 88 contains a series of contacts 108, 109 and 110 for modification in the primary winding and a series of contacts 111, 112 and 113 for modification in the primary winding, auxiliary winding and phase advancing capacitor. The switch 87 for the two speed motor is installed, for example, on the front panel of a VTR system for switchover between the standard mode and the period expansion mode. A terminal 114 is connected with a d.c. voltage supply and a plug 115 is connected with a commercial power source (a.c. voltage source).

During the standard mode of operation the switch 87 of FIG. 7 is in the open state and no excitation current from the d.c. source flows through the relay 88 thereby establishing connection between the contacts 108 and 109 and between the contacts 111 and 112. When this occurs, current flows from the plug 115 to the series circuit including the primary winding 102, the auxiliary winding 104 and the phase advancing capacitor 106 used for the four-pole revolution in a manner to speed up the two speed motor 20. In contrast with the above, the switch 87 is turned to its closed state during the period expansion mode of operation. Excitation current through the relay 88 flows in a circuit loop which comprises the primary winding 103, the auxiliary winding 105 and the capacitor 107 all used for the eight pole revolution. The result is a reduction in the speed of the two speed motor 20.

Since the switch 87 and the record/playback switch 100 are connected in series, the relay 88 is excited, i.e., a.c. power supply is impressed through connection between the contacts 108 and 110 and between the contacts 111 and 113 on the eight pole circuit loop including the components 103, 105 and 107 with the result in speed reduction of the two speed motor 20 only during the conditions wherein the switch 87 is in the closed state (the period expansion mode) and the record/playback switch 100 is in the closed state (record and playback). Because the two speed motor 20 rotates at the high speed at the threading operation in both the standard mode and the period expansion mode, the period required from the beginning of the threading operation to passage of the magnetic tape 5 through the sensing station of FIG. 1 is placed within the predetermined one, thereby ensuring the threading operation even during the period expansion mode of operation. In addition, this can shorten the periods of time required for fast forward and rewind.

In the event the VTR system employs the rotary transducing head phase control scheme of FIG. 5, although the respective video tracks can be reproduced by means of the same rotary tranducing heads as employed for the recording during the standard mode due to the pre-determined relation between the pulse from the tonewheel head and the control signal on the magnetic tape, the respective video tracks can not be necessarily be reproduced or played back by means of the same transducing head during the period expansion mode because of currently occurring reduction in the revolution rate. For this reason, the angular error loss (or azimuth loss) becomes remarkably greater. This L will be given as follows:

$$L = 20 \log \frac{\sin\left(\frac{\pi W}{\lambda} \tan \theta\right)}{\frac{\pi W}{\lambda} \tan \theta}$$

Wherein W is the track width, λ is the record wavelength and θ is the angular error.

As defined in the foregoing equation, the angular error loss L increases correspondingly with increase in the angular error θ and with decrease in the wavelength λ. It will be understood for such definition that the possible angular loss during the period expansion mode increases greatly as compared with the standard mode because the wavelength λ during the period expansion mode is reduced to the one-half of that during the standard mode.

In order to eliminate the disadvantage discussed above, there are provided, as shown in FIG. 8, a flip flop 116, standard/period expansion switches 117 and 118 and a variable resistor 119 for tracking adjustment during the period expansion mode within the rotary transducing head phase control scheme of FIG. 5.

Figure 8:
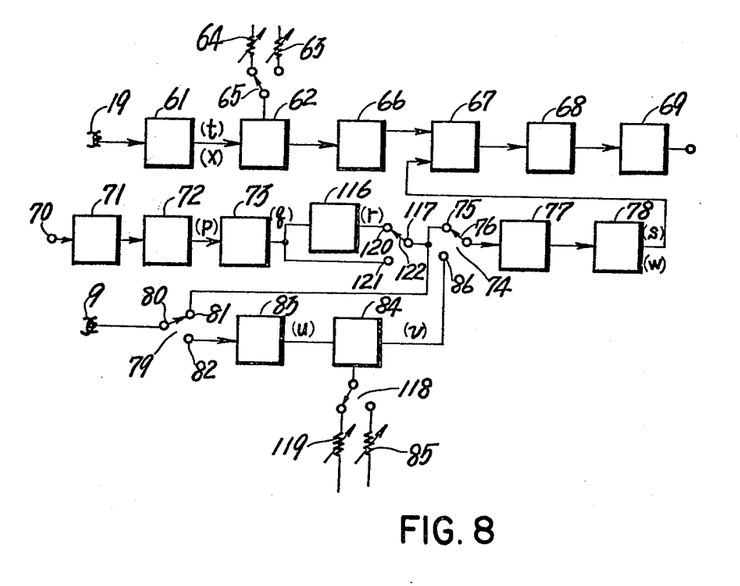
FIG. 8 is a partially schematic diagram of still another embodiment of the present VTR system.

In FIG. 8, a flip flop 116 is connected with the flip flop 73 of FIG. 5. The standard/period expansion mode switch 117 has a period expansion terminal 120 connected with the flip flop 116 and a standard terminal 121 connected with the flip flop 73 and a movable terminal 122 connected with the record terminal 75 of the record/playback switch 74 of FIG. 5. The multivibrator 84 contains a variable resistor 119 for tracking adjustment during the period expansion mode connected in parallel relation with the variable resistor 85 for tracking adjustment during the standard mode. Selection of the variable resistors 85 and 119 is through a switch 118.

Figure 9:
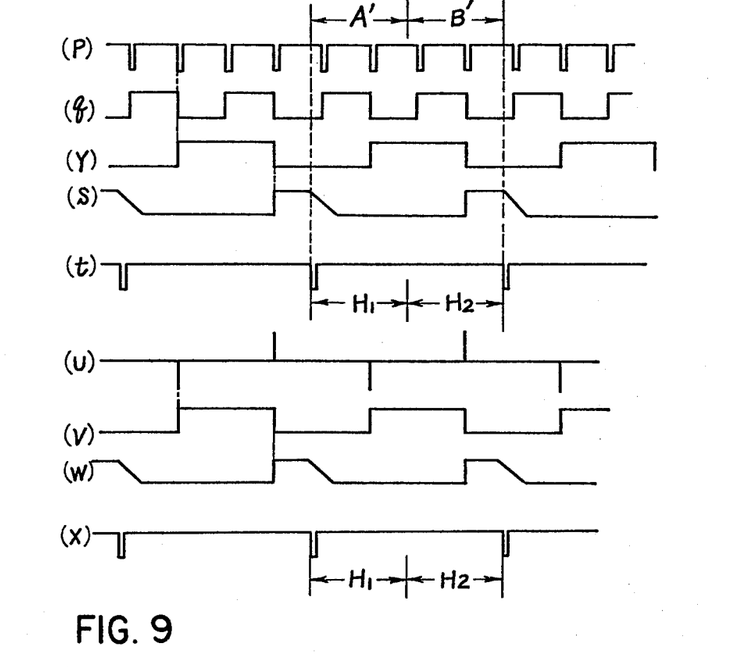
FIG. 9 is an illustrative diagram of waveforms of outputs derived from respective points of the embodiment shown in FIG. 8.

With such an arrangement the operational conditions for the phase control for the rotary transducing heads are as follows. The switches 65, 117 and 118 are all turned to the period expansion mode. On record the selection terminals 76 and 80 of the record/playback switches 74 and 80 are in contact with the record terminals 75 and 81. As being discussed with reference to the operational description of the embodiment of FIG. 5, the vertical synchronizing signals extracted from the video signal through the vertical synchronizing splitter 71 is applied to the pulse amplifier 72 to produce the pulse as shown in FIG. 9(p) at the output terminal thereof, that pulse being supplied to the flip flop 73 to produce the pulse of FIG. 9(q) at their output terminal. The resultant pulse is then applied to the additional flip flop 116 to produce the pulse having a period corresponding to the length of four fields as illustrated in FIG. 9(r), that pulse being applied through the additional switch 117 to the record site 75 of the record/playback switch 74. The pulse through the record/playback switch 74 is applied via the separate record/playback switch 80 to the control head 9 which functions to record the control signal on the magnetic tape 5.

The pulse through the record terminal 75 of the record/playback switch 74 reaches at the multivibrator 77. Under these situations, the trapezoidal generator 78 produces the trapezoidal output as shown in FIG. 9(s) at the output terminal. The pulse through the tonewheel head 19 is emphasized by the pulse amplifier 61 of which the output is illustrated in FIG. 9(t). Upon the period of this pulse the recording is carried out over the periods A' and B' shown in FIG. 9 corresponding to the operational periods $H_1$ and $H_2$ of the rotary transducing heads 15 and 16. The circuits 62, 66, 67 and 68 also operate in the same manner as being discussed with reference to FIG. 5 such that the phase control for the rotary transducing heads is accomplished under control of current flow through the brake coil 18 due to action of the brake coil activator circuit 69.

The operational conditions for playback during the period expansion mode occurs in the following sequence. The record/playback switches 74 and 80 enable their playback terminals 86 and 82 respectively. The control signal played back through the head 19 is supplied via the switch 79 to the pulse amplifier 83 to provide the pulse of FIG. 9(u) at their output terminal and then to the multivibrator 84 to provide the pulse of FIG. 9(v). The resistive value of the tracking adjustment resistor 119 is chosen such that the period of the pulse of FIG. 9(u) is variable centered on the length of four fields.

Application of such pulse to the multivibrator 77 through the record/playback switch 74 permits the trapezoidal generator 78 to produce the trapezoidal waveform as shown in FIG. 9(w) in cooperation with the multivibrator 78. The pulse amplifier 61 receives and then emphasizes the pulse from the tonewheel head 19 and consequently outputs the pulse as shown in FIG. 9(x). The circuits 62 and 66 through 69 operate in the same manner as during the recording to perform phase control for the rotary transducing heads.

It will be clear from the foregoing description that in the absence of the flip flop 116 the period of the output (trapezoidal) from the trapezoidal generator 78 corresponds to the length of two fields and thus equals one-half of the period of the pulse from the tonewheel head 19. However, as described with reference to FIGS. 8 and 9, in the presence of the flip flop 116 the trapezoidal output from the generator 78 has the period equal to the length of four fields and, in other words, to the period of the pulse from the tonewheel head 19. Therefore, since the periods $H_1$ and $H_2$ shown in FIG. 9(x) where the rotary transducing heads 15 and 16 travel on the megnetic tape 5 coincide with the periods A' and B' shown in FIG. 9 (p), the respective one of the tracks on the magnetic tape 5 are reproduced by means of the rotary transducing heads 15 and 16 which are employed during the recording. This eliminates the shortcoming due to the angular error loss.

Figure 10:
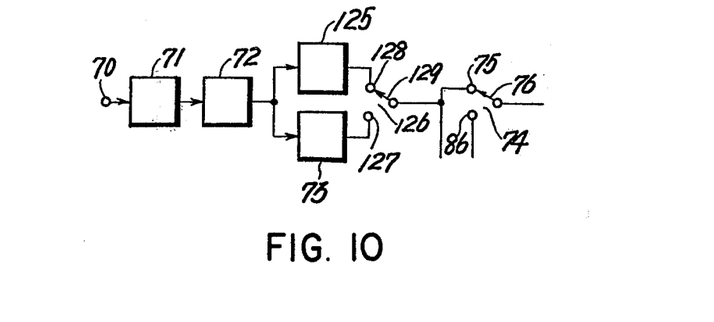
FIGS. 10 and 11 are circuit diagrams of the embodiment shown in FIG. 8.
Figure 11:
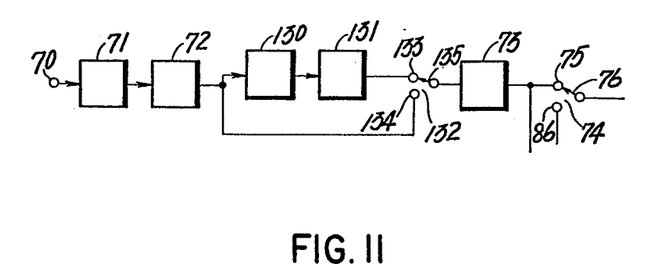

Another ways of eliminating the shortcoming due to the angular error as set forth above are illustrated in FIGS. 10 and 11 respectively. The embodiment of FIG. 10 includes a mono-stable multivibrator 125 connected in parallel with the flip flop 73 (FIG. 5), a standard/period expansion mode switch 126 having three terminals 127, 128 and 129, one 127 (standard site) being connected with the flip flop 73, another 128 (period expansion site) being connected with the multivibrator 125 and third 129 (movable) being connected with record site 75 of the record/playback switch 76.

FIG. 11 shows the alternate improved circuit which comprises a mono-stable multivibrator 130 situated after the pulse amplifier 72 (FIG. 5), an inverter circuit 131 situated after the multivibrator 130 and a mode switch 132 having its period expansion site 133 connected with the inverter circuit 131, its standard site 134 connected with the pulse amplifier 72 and its movable arm terminal 135 connected with the flip flop 73 of FIG. 5.

Although, as being illustrated and described with reference to FIG. 8, two variable resistors 85 and 119 are installed on the front panel of the VTR system for tracking adjustment during the standard mode and the period expansion mode, there is still the requirement in view of space occupation that only a single variable resistor enables tracking adjustment for both standard mode and the period expansion mode.

Figure 12:
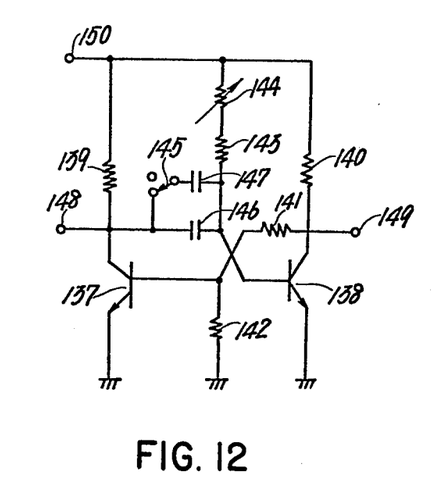
FIG. 12 is a circuit diagram of a further embodiment of this invention.

FIG. 12 suggests one approach to fulfill the above requirement. The multivibrator 84 of FIG. 5 is implemented with a circuit construction shown in FIG. 12 which comprises NPN type transistors 137 and 138, fixed resistors 139 through 143, a variable resistor 144 for tracking adjustment, a standard/period expansion mode switch 145 (equivalent to the switch 118 of FIG. 8), a capacitor 146 effective only for the standard mode, a capacitor 147 connected in parallel with the capacitor 146 through the switch 145 only during the period expansion mode, an input terminal 148, an output terminal 149 and a d.c. supply terminal 150.

It will be noted from the above discussion that the pulse width T for the tracking multivibrator during the standard mode and the pulse width T' during the period expansion mode be correlated as follows.

$$T' = 2T$$

As well known in the art, the pulse widths T and T' can be expressed by the following equation wherein R is the resistance of the variable resistor 144, $r$ is the resistance of the fixed resistor 143 and $C_1$ and $C_2$ are the capacitances of the capacitors 146 and 147;

$$T = 0.69\ C_1\ (R + r)$$
$$T' = 0.69\ (C_1 + C_2)\ (R + r)$$

Therefore, the capacitances $C_1$ and $C_2$ of the capacitors 146 and 147 should be equal to the condition $T' = 2T$ defined above.

$$C_1 = C_2$$

In practical use, the condition $T' = 2T$ with respect to the pulse width and hence capacitance is not necessarily satisfied accurately. It is not objectionable that $C1 \simeq C_2$.

Alternate approach to fulfill the space requirement may consist of a variable resistor of one-shaft two-leaf construction which makes up two separate variable resistors 85 and 119.

The VTR system operable in either the standard mode or the period extension mode has been illustrated and described. The preferred embodiment is illustrative only and not intended to be limitative. Those skilled in the art may be able to modify the embodiments shown and described. Such modifications which do not depart from the scope of the invention are intended to be covered by the appended claims.

I claim:

1. A system for recording on tracks on a movable recording medium a video signal consisting of multiple fields and for reproducing said video signals comprising:
    a. means for moving said transducing head means at a first relative speed with respect to said recording medium during a first operational mode to record one of said fields of said video signal on each of said tracks;
    b. means for moving the same transducing head means and said recording medium at said first relative speed to reproduce said fields recorded during said first operational mode;
    c. means for reducing said first relative speed between said transducing head means and said recording medium to (1/n) of said first relative speed, where $n$ is an integer equal to or greater than 2, to enable said transducing head means to record $n$ fields of said video signal on each of said tracks in a second operational mode;
    d. means for moving the same transducing head means and said recording medium at (1/n) of said first relative speed to reproduce said fields recorded during said second operational mode; and
    e. means for correcting for angular error loss during the reproducing of said video signals in second operational mode to thereby facilitate the use of said same transducing head means for reproducing said video signals.

2. The system defined in claim 1 further including:
    switch means for providing an energizing voltage to said means for reducing said first relative speed; and
    means for actuating said switch means only during the record and reproducing modes during said second operational mode;
    whereby other functions during said second operational mode such as fast forward and rewind take place at said first relative speed.

3. The system defined in claim 1 further including:
    means for recording control signals on a control track on said recording medium;
    means for generating vertical synchronizing signals of a predetermined frequency within said video signal; and
    control signal generating means for dividing said predetermined frequency by $2n$ to record control signals on said control track corresponding to the length of $2n$ fields during said second operational mode.

* * * * *